(12) United States Patent
Hasegawa et al.

(10) Patent No.: US 9,872,226 B2
(45) Date of Patent: Jan. 16, 2018

(54) WIRELESS ACCESS SYSTEM AND FIXED TERMINAL CONTROL APPARATUS

(71) Applicant: FUJITSU LIMITED, Kawasaki-shi, Kanagawa (JP)

(72) Inventors: Noboru Hasegawa, Oota (JP); Hiroaki Maruyama, Sagamihara (JP); Hiromitsu Kawai, Yokohama (JP); Kazunari Kobayashi, Yokohama (JP); Yuki Shinada, Saitama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/583,622

(22) Filed: May 1, 2017

(65) Prior Publication Data

US 2017/0238238 A1    Aug. 17, 2017

Related U.S. Application Data

(63) Continuation of application No. PCT/JP2014/081130, filed on Nov. 25, 2014.

(51) Int. Cl.
*H04W 48/04* (2009.01)
*H04W 60/00* (2009.01)
(Continued)

(52) U.S. Cl.
CPC ........... *H04W 48/04* (2013.01); *H04W 60/00* (2013.01); *H04W 76/04* (2013.01); *H04W 88/02* (2013.01)

(58) Field of Classification Search
CPC ...... H04W 48/04; H04W 60/00; H04W 76/04
See application file for complete search history.

(56) References Cited

U.S. PATENT DOCUMENTS 5,970,064 A * 10/1999 Clark .................. H04L 41/0813
370/242
6,282,197 B1 * 8/2001 Takahashi .............. H04L 45/10
370/230
(Continued)

FOREIGN PATENT DOCUMENTS

EP    2 536 219 A1    12/2012
EP    2 555 562 A1    2/2013
(Continued)

OTHER PUBLICATIONS

International Search Report for related foreian application PCT/JP2014/081130 dated Mar. 3, 2015.
(Continued)

*Primary Examiner* — Qun Shen
(74) *Attorney, Agent, or Firm* — Arent Fox LLP

(57) ABSTRACT

A wireless access system includes a terminal; and a fixed terminal control apparatus configured to identify based on position information of the terminal, whether the terminal is a fixed terminal having no change in position for a predetermined period of time, the fixed terminal control apparatus identifying whether the terminal is the fixed terminal, when the fixed terminal control apparatus receives from the terminal, a connection request requesting connection to a network of the terminal, the fixed terminal control apparatus further configured to deny the connection request according to a predetermined probability, when identifying the terminal to be the fixed terminal.

8 Claims, 14 Drawing Sheets

(51) Int. Cl.
*H04W 76/04* (2009.01)
*H04W 88/02* (2009.01)

(56) References Cited

U.S. PATENT DOCUMENTS

| | | | |
|---|---|---|---|
| 2002/0090945 A1 | 7/2002 | Sasada | |
| 2004/0203384 A1* | 10/2004 | Sugikawa | H04W 12/06 455/41.2 |
| 2011/0098020 A1 | 4/2011 | Van Loon et al. | |
| 2011/0199905 A1 | 8/2011 | Pinheiro et al. | |
| 2011/0274040 A1* | 11/2011 | Pani | H04W 4/005 370/328 |
| 2012/0039171 A1 | 2/2012 | Yamada et al. | |
| 2013/0005387 A1 | 1/2013 | Aso et al. | |
| 2013/0095879 A1* | 4/2013 | Gupta | H04W 76/027 455/525 |
| 2013/0136072 A1* | 5/2013 | Bachmann | H04W 4/00 370/329 |
| 2013/0162026 A1 | 6/2013 | Kinoshita et al. | |
| 2015/0271763 A1* | 9/2015 | Balachandran | H04W 52/245 370/338 |

FOREIGN PATENT DOCUMENTS

| | | |
|---|---|---|
| JP | 2002-209247 A | 7/2002 |
| JP | 2004-088502 A | 3/2004 |
| JP | 2002-209247 A | 10/2012 |
| JP | 2012-209247 A | 10/2012 |
| JP | 2013-536636 A | 9/2013 |
| JP | 2013-247588 A | 12/2013 |
| JP | 2013-258704 A | 12/2013 |
| WO | WO 2011-121921 A1 | 10/2011 |

OTHER PUBLICATIONS

International Search Report for related foreign application PCT/JP2014/081130 dated Mar. 3, 2015.
Extended European Search Report of related European Patent Application No. 14907111.0 dated Oct. 17, 2017.
3GPP TS 22.368 V13.0.0 (Jun. 2014) 3$^{rd}$ Generation Partnership Project; Technical Specification Group Services and System Aspects; Service requirements for Machine-Type Communications (MTC); Stage 1.

* cited by examiner

FIG.7A

| TERMINAL NUMBER | REGISTRATION DATE AND TIME | POSITION NUMBER |
|---|---|---|
| TERMINAL 1 | OLDEST REGISTRATION: yyyy.mm.dd 14.05.31<br>LATEST REGISTRATION: yyyy.mm.dd 11:05:15 | area 1 |
| TERMINAL 2 | OLDEST REGISTRATION: yyyy.mm.dd 13.10.01<br>LATEST REGISTRATION: yyyy.mm.dd 10:00:25 | area 2 |
| TERMINAL 3 | OLDEST REGISTRATION: yyyy.mm.dd 14.05.31<br>LATEST REGISTRATION: yyyy.mm.dd 10:53:23 | area 3 |
| TERMINAL 4 | OLDEST REGISTRATION: yyyy.mm.dd 14.05.31<br>LATEST REGISTRATION: yyyy.mm.dd 11:59:22 | area 1 |
| TERMINAL 5 | OLDEST REGISTRATION: yyyy.mm.dd 14.06.01<br>LATEST REGISTRATION: yyyy.mm.dd 20:32:41 | area 3 |
| ... | ... | ... |

| POSITION REGISTRATION COUNT | CURRENT DENIAL DETERMINATION VALUE |
|---|---|
| ○△□ | ×◇% |

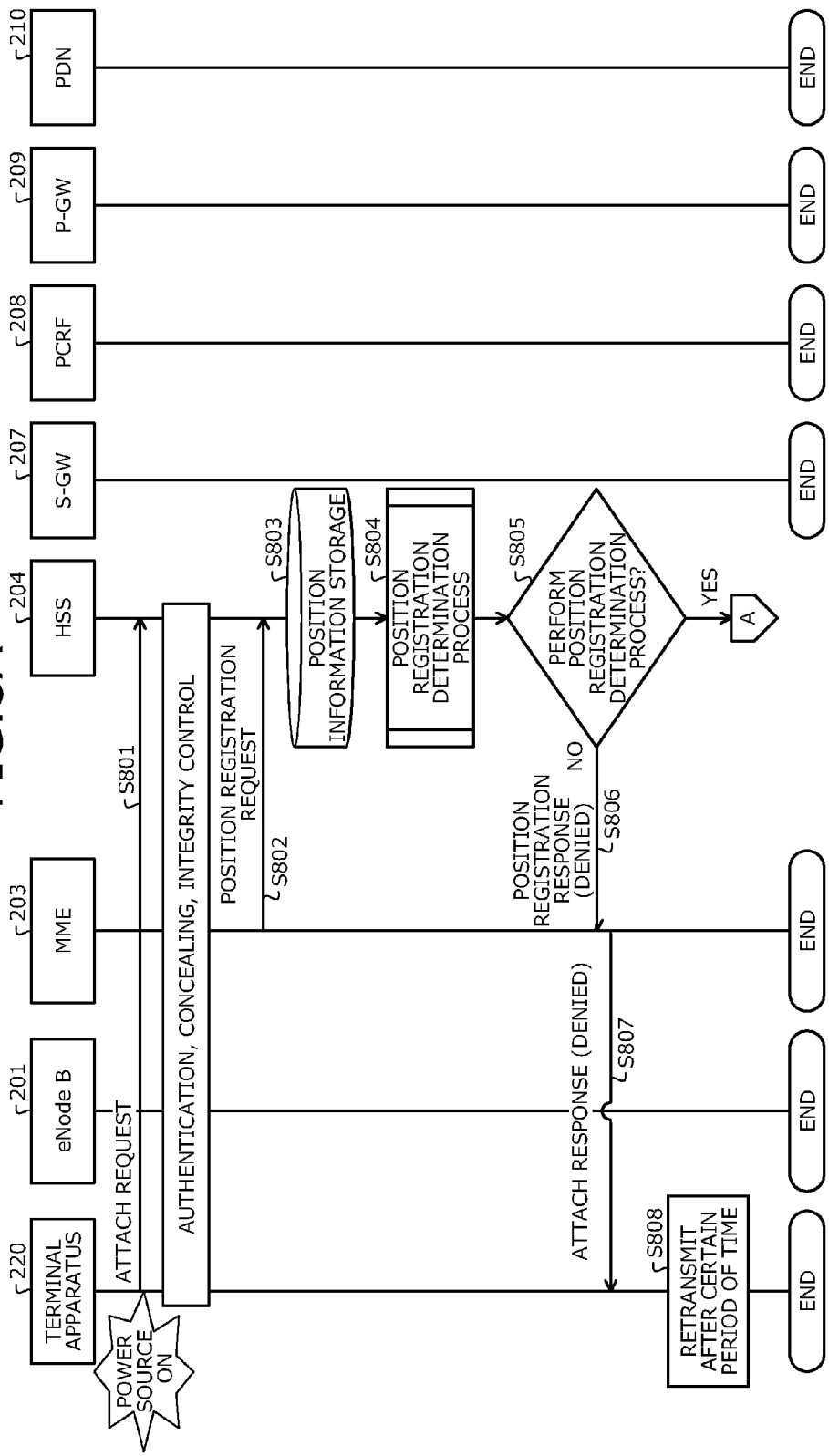

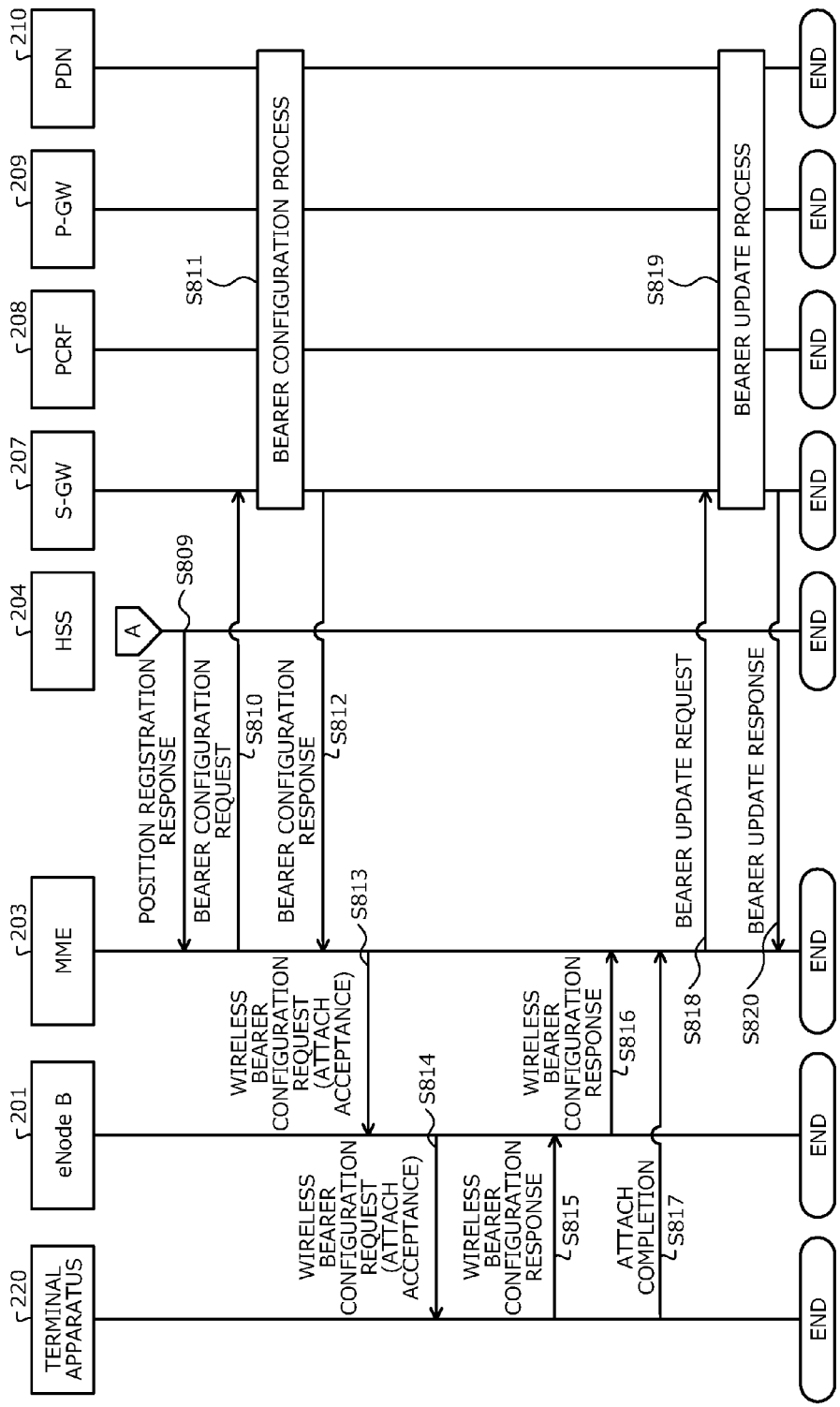

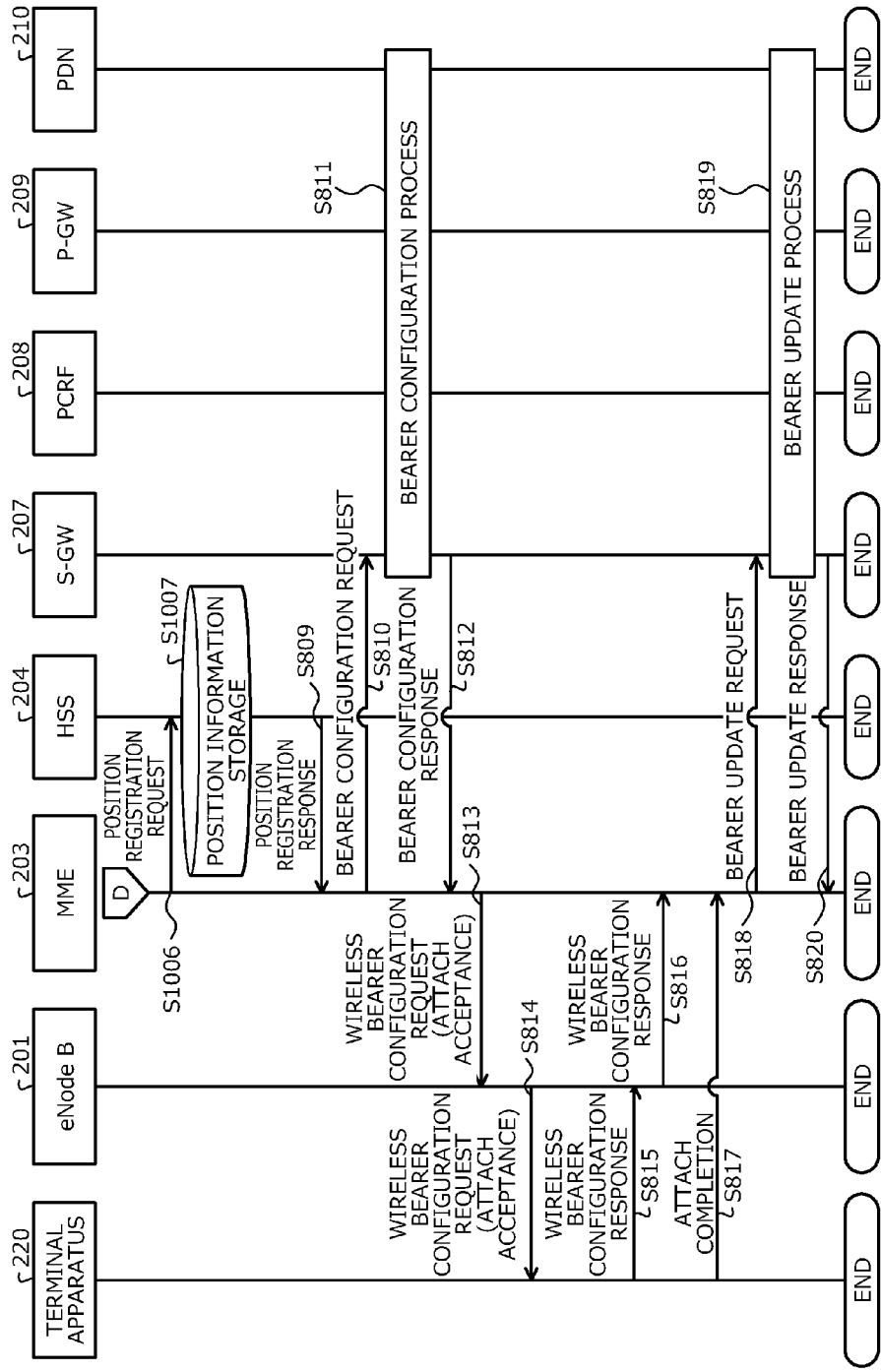

WIRELESS ACCESS SYSTEM AND FIXED TERMINAL CONTROL APPARATUS

CROSS REFERENCE TO RELATED APPLICATIONS

This application is a continuation application of International Application PCT/JP2014/081130, filed on Nov. 25, 2014, and designating the U.S., the entire contents of which are incorporated herein by reference.

FIELD

The embodiments discussed herein relate to a wireless access system and a fixed terminal control apparatus.

BACKGROUND

According to a conventional position registration method, a terminal uses a beacon signal to detect a neighbor terminal, creates list data for terminals of the same type for a terminal count n, and gives notification of a position on a network side for a rate of 1/n (for example, refer to Japanese Laid-Open Patent Publication No. 2013-247588). According to a conventional access method, load information history of a network is used to notify terminals of an interval of an access permitted period and when an access request is received outside an access permitted period, network attachment is denied (for example, refer to Japanese Laid-Open Patent Publication No. 2013-258704). Further, according to a conventional communications node, an existing node notifies a new node of the next connection time so that the new node can connect after the connection of the existing node by obtaining from the existing node, configuration information for operation by the newly added node (for example, refer to International Publication No. 2011/121921).

SUMMARY

According to an aspect of an embodiment, a wireless access system includes a terminal; and a fixed terminal control apparatus configured to identify based on position information of the terminal, whether the terminal is a fixed terminal having no change in position for a predetermined period of time, the fixed terminal control apparatus identifying whether the terminal is the fixed terminal, when the fixed terminal control apparatus receives from the terminal, a connection request requesting connection to a network of the terminal, the fixed terminal control apparatus further configured to deny the connection request according to a predetermined probability, when identifying the terminal to be the fixed terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7A is an explanatory diagram depicting an example of registration information stored in a position registration information storage unit;

FIG. 7B is an explanatory diagram depicting an example registration information stored by a determination information storage unit;

FIG. 8A is a sequence diagram (part 1) depicting an example of position registration performed by the wireless access system;

FIG. 8B is a sequence diagram (part 2) of the example of the position registration performed by the wireless access system;

FIG. 10B is a sequence diagram (part 2) of the modification example of the position registration performed by the wireless access system.

DESCRIPTION OF THE INVENTION

Embodiments of the disclosed technique will be described in detail with reference to the accompanying drawings.

Figure 1:
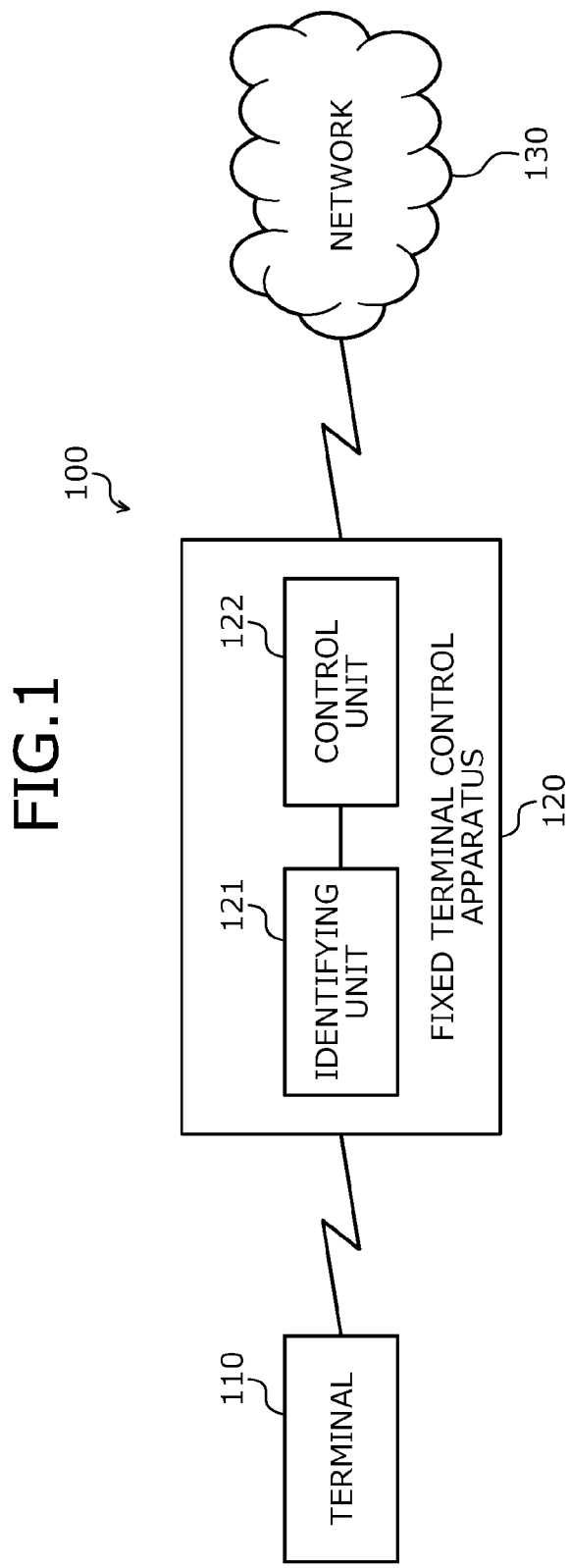
FIG. 1 is a diagram depicting one example of a wireless access system and a fixed terminal control apparatus according to an embodiment.

FIG. 1 is a diagram depicting one example of a wireless access system and a fixed terminal control apparatus according to an embodiment. In FIG. 1, a wireless access system 100 has terminals 110 and a fixed terminal control apparatus 120. The terminals 110 include mobile terminals and fixed terminals.

Among the terminals 110, for example, a device having a communications function of autonomously transmitting and receiving information (data) without human operation is called a machine-to-machine (M2M) device. M2M devices have increased in number in recent years and are predicted to reach enormous numbers in the future. M2M devices may be classified into mobile terminals and fixed terminals.

A mobile terminal, for example, is a communications device provided on a mobile object such as a vehicle or person. A fixed terminal, for example, is a communications device provided on a device (for example, a device arranged in a fixed manner) having a low level of mobility such as a vending machine, video surveillance camera, a smartmeter, and the like. Such fixed terminals may be devices attached in a fixed manner to a predetermined plot of land/building or the like, or may be devices placed in mobile state without being attached a predetermined plot of land/building or the like.

These M2M devices use wireless lines, not wired lines. For example, in the case of a wired line, construction to connect the devices by a wired line is necessary whereas in the case of a wireless line, such construction is not necessary. Furthermore, with respect to wireless lines, existing 3rd generation (3G) or 4G mobile communications systems, Wireless Fidelity (Wi-Fi) (Wi-Fi is a registered trademark), and the like are used. Therefore, under the 3rd Generation Partnership Project (3GPP) as well, the incorporation of M2M devices is under investigation.

Under 3GPP, M2M devices are defined as machine type communication (MTC). Currently under 3GPP, MTC has been newly defined by Release 11, as an identification of the terminals 110 and there are methods for giving notification of notification information such as by System Information Blocks (SIBs) 14.

On the other hand, fixed terminals are not currently defined under 3GPP, i.e., fixed terminals cannot be identified. Thus, in the present embodiment, position information of the terminals is used and a fixed terminal is identified as a terminal having no change in position for a certain period of time.

Further, a fixed terminal, for example, does not have an internal power source such as a battery and is supplied with power from an external source. Therefore, for example, during a power outage, power supply from the external source cannot be received and the power supply decreases. Furthermore, when the power outage is resolved, the fixed terminals in the concerned area startup all at once and thus, connection requests for connecting to the network are transmitted all at once to a core apparatus from the fixed terminals. Therefore, sequences for connecting the fixed terminals to the network concentrate, causing congestion of the network to occur.

Thus, in the present embodiment, the fixed terminal control apparatus 120 of the wireless access system 100 regards the terminals 110 having no change in position for a certain period of time as fixed terminals that use an external power source and denies connection requests from the fixed terminals to a network 130 according to a predetermined probability. As a result, when the external power source is restored after a power outage, processing of connecting the terminals 110 to the network 130 is distributed, enabling congestion of the network 130 to be suppressed.

The terminal 110 depicted in FIG. 1, for example, at the time of startup or the like, makes a request to the fixed terminal control apparatus 120, for connection to the network 130. Further, without limitation to the time of startup, the terminal 110, for example, makes a request to the fixed terminal control apparatus 120, for connection to the network 130, based on user operation input.

The fixed terminal control apparatus 120 has an identifying unit 121 and a control unit 122. The identifying unit 121, when a connection request is received from a terminal 110, identifies based on position information of the terminal 110, whether the terminal 110 is a fixed terminal having no change in position for a predetermined period. Although position information is, for example, information indicating a position registration area of the base station accommodating the terminal 110, without limitation hereto, the position information may be information indicating coordinates or a geographical point where the terminal 110 is located, information indicating an area different from the position registration area, information indicating a cell, or the like.

The identifying unit 121, when there is no change in the information indicating the position registration area of the terminal 110 for a predetermined period, identifies the terminal 110 to be a fixed terminal. Therefore, even if the terminal 110 is a mobile terminal, when there is no change in the information indicating the position registration area of the terminal 110, the mobile terminal is identified as a fixed terminal. An n period may be configured to be an arbitrary period. The longer the predetermined period is configured to be, the higher the accuracy is in identifying a mobile terminal as a fixed terminal.

The control unit 122, when the terminal 110 is identified to be a fixed terminal by the identifying unit 121, denies the connection request according to the predetermined probability. Denial of a connection request is an instance in which connection of the terminal 110 to the network 130 is not performed, for example, the connection request is ignored. The predetermined probability is an arbitrary probability. As a result, when the external power source is restored after a power outage, processing of connecting the terminals 110 to the network 130 is distributed, enabling congestion of the network 130 to be suppressed.

Further, the terminal 110, when the connection request thereof has been denied by the fixed terminal control apparatus 120, again makes a connection request to the fixed terminal control apparatus 120. Further, the control unit 122, when having denied the connection request, may transmit to the terminal 110, a signal indicating denial of the connection request. For example, assuming a configuration in which the fixed terminal control apparatus 120 transmits a signal indicating denial of a connection request when denying the connection request, the terminal 110, after receiving the signal from the fixed terminal control apparatus 120, may again make a connection request. "After receiving the signal", for example, may mean immediately after the signal is received, or may mean after a predetermined period has elapsed after the signal is received.

Further, assuming a configuration in which the control unit 122 does not transmit a signal indicating denial of a connection request when denying the connection request, the terminal 110, when being unable to connect to the network 130 for a predetermined period after the connection request, may again make a connection request. In this manner, by again making a connection request, a terminal 110 that is denied connection to the network 130 may connect to the network 130.

Further, when the control unit 122 receives a connection request from one or more of the terminals 110 within a predetermined period (the connection request requesting connection to the network 130) and the number of times a connection request was not denied is less than a predetermined count, the control unit 122 does not deny the connection request from a terminal 110 identified to be a fixed terminal. For example, the fixed terminal control apparatus 120 may receive plural connection requests from a single terminal 110 within the predetermined period.

Not denying a connection request is allowing the terminal 110 to connect to the network 130. An instance in which the number of times a connection request was not denied is less than the predetermined count, for example, is an instance in which sequences for connecting fixed terminals to the network 130 do not concentrate. Therefore, when sequences for connecting fixed terminals to the network 130 do not concentrate, the control unit 122 does not deny the connection request from a terminal 110 identified to be a fixed terminal by the identifying unit 121.

On the other hand, when the number of times that a connection request was not denied is the predetermined count or greater, the control unit 122 denies a connection request from a terminal 110 identified to be a fixed terminal by the identifying unit 121. An instance in which the number of times that a connection request was not denied is the predetermined count or greater is an instance in which sequences for connecting fixed terminals to the network 130 are concentrating.

Therefore, when the sequences for connecting fixed terminals to the network 130 are concentrating, the fixed terminal control apparatus 120 may deny the connection request from a terminal 110 identified to be a fixed terminal by the identifying unit 121.

Further, the control unit 122 receives connection requests from one or more of the terminals 110 within the predetermined period (the connection requests requesting connection to the network 130) and according to a predetermined probability corresponding to the number of times that a connection request was not denied, denies a connection request from a terminal 110 identified to be a fixed terminal. For example, the control unit 122 may set the probability of connection request denial to be higher, the greater the number of times a connection request was not denied is.

For example, when the number times that a connection request was not denied is 100 times, the probability of denying a connection request (predetermined probability) may be 10%; in the case of 200 times, the probability of denying a connection request may be 20%; and in the case of 500 times, the probability of denying a connection request may be 50%. As a result, the control unit 122 may deny a connection request from a terminal 110 identified to be a fixed terminal by the identifying unit 121, according to a probability corresponding to the extent that sequences for connecting fixed terminals to the network 130 are concentrating.

Further, when the number of times that a connection request requesting connection to the network 130 is received from one or more of the terminals 110 within a predetermined period is less than a predetermined count, the control unit 122 does not deny a connection request from a terminal 110 identified to be a fixed terminal by the identifying unit 121. An instance in which the number of times that a connection request is received within the predetermined period is less than the predetermined count is, for example, an instance in which connection requests are few such as during a normal state excluding times when the power source is restored after a power outage. Therefore, during a normal state when the connection requests are few, the control unit 122 does not deny a connection request from a terminal 110 identified to be a fixed terminal by the identifying unit 121.

On the other hand, when the number of times that a connection request requesting connection to the network 130 is received from one or more of the terminals 110 within a predetermined period is the predetermined count or greater, the control unit 122 denies a connection request from a terminal 110 identified to be a fixed terminal by the identifying unit 121. An instance in which the number of times that a connection request is received within the predetermined period is the predetermined count or greater is an instance in which the connection requests are numerous such as when the power source is restored after a power outage.

Therefore, when the connection requests are numerous at the time of restoration of the power source after a power outage, the fixed terminal control apparatus 120 may deny a connection request of a terminal 110 identified to be a fixed terminal by the identifying unit 121.

Further, the control unit 122 may deny a connection request from a terminal 110 identified to be a fixed terminal by the identifying unit 121, according to a predetermined probability corresponding to the number of times that a connection request requesting connection to the network 130 is received from one or more of the terminals 110 within the predetermined period. For example, the control unit 122 may set the probability of connection request denial higher, the greater the number of times a connection request is received within the predetermined period is.

For example, when the number of times that a connection request is received within the predetermined period is 100 times, the probability of denying a connection request may be 10%; in the case of 200 times, the probability of denying a connection request may be 20%; in the case of 500 times, the probability of denying a connection request may be 50%. As a result, the control unit 122 may deny a connection request from a terminal 110 identified to be a fixed terminal by the identifying unit 121, according to a probability corresponding to the number of connection requests at the time of power source restoration after a power outage.

Figure 2:
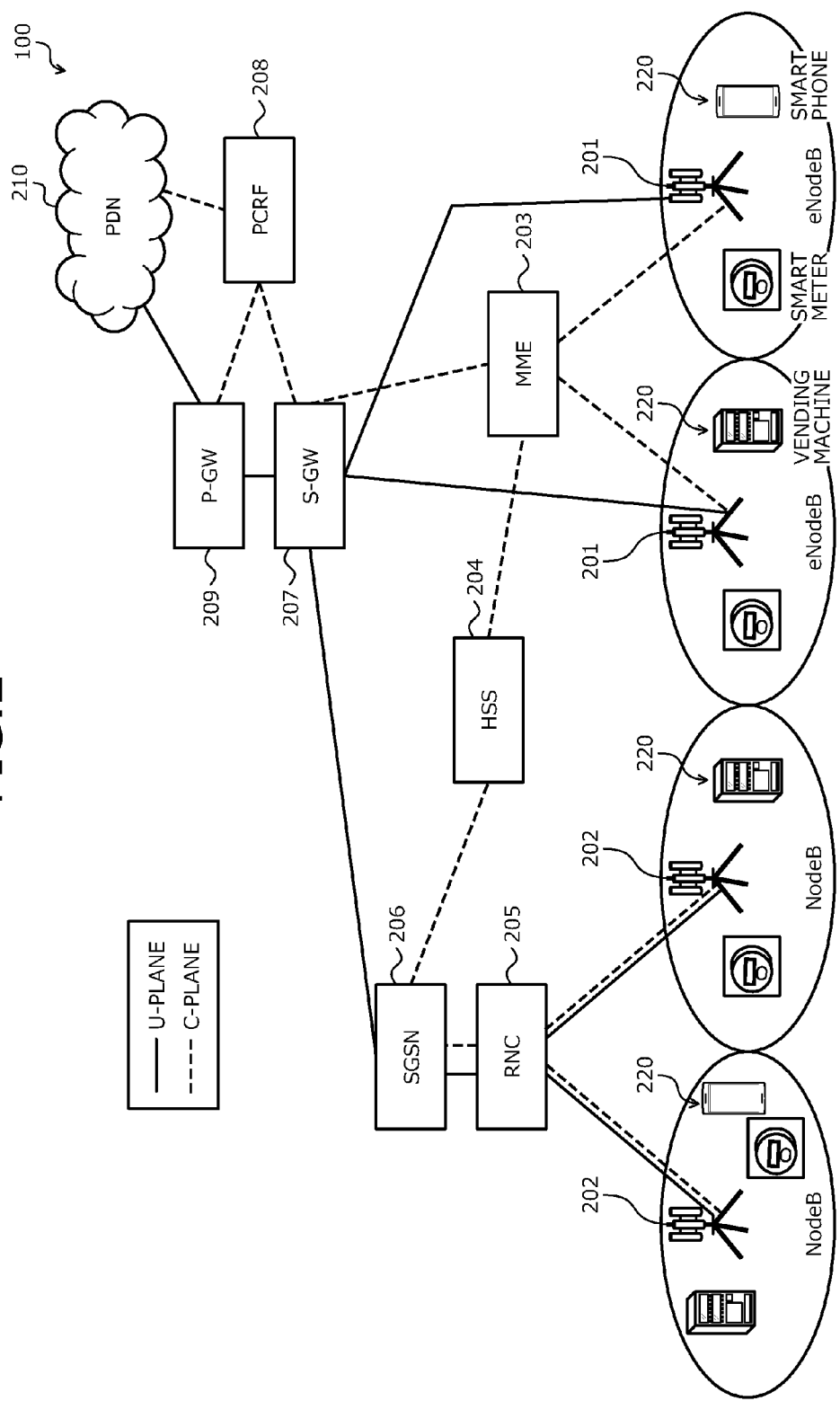
FIG. 2 is a diagram depicting one example of a wireless access system 100.

FIG. 2 is a diagram depicting one example of the wireless access system 100. As depicted in FIG. 2, the wireless access system 100 has evolved Nodes B (eNodeBs) 201, NodeBs 202, and a mobile management entity (MME) 203. The wireless access system 100 further has a home subscriber server (HSS) 204 and a radio network controller (RNC) 205.

The wireless access system 100 further has a SGSN (Serving GPRS (General Packet Radio Service) Support Node) 206 and a Serving-Gate Way (S-GW) 207. The wireless access system 100 further has a Policy and Charging Rule Function (PCRF) 208, a Packet Data Network-GW (P-GW) 209, and terminal apparatuses 220.

As depicted in FIG. 2, the terminal apparatuses 220 include mobile terminals such as a smartphone, and provided fixed terminals such as a vending machine and a smartmeter. The terminal apparatuses 220, for example, correspond to the terminal 110 depicted in FIG. 1. For example, the terminal apparatus 220, when the power source is turned ON, transmits to the MME 203, an attach request signal for requesting connection to a network of the terminal apparatus 220.

The eNodeBs 201 are wireless base stations supporting Long Term Evolution (LTE) scheme wireless signals and accommodate the terminal apparatuses 220. The eNodeBs 201 transmit control data to and receive control data from the MME 203 and transmit user data to and receive user data from the S-GW 207.

The NodeBs 202 are Wideband Code Division Multiple Access (W-CDMA) wireless base stations and accommodate the terminal apparatuses 220. The NodeBs 202 transmit control data and user data to and receive control data and user data from the RNC 205.

The MME 203 accommodates the eNodeBs 201 and performs authentication (security control) and movement management of the terminal apparatuses 220, and configures user data transfer paths. For example, the MME 203 performs management of handover between the eNodeBs 201, calling, and position registration of the terminal apparatuses 220. The MME 203 transmits control data to and receives control data from the eNodeBs 201, the HSS 204, and the S-GW 207.

Further, for example, the MME 203 performs user authentication based on authentication information received from the HSS 204, and receives and manages contract information from the HSS 204, the contract information being necessary in bearer configuration. Based on information of a connection destination transmitted from the terminal apparatuses 220, the MME 203, selects by Domain Name System (DNS), bearer configuration destinations: the S-GW 207 and the P-GW 209. The MME 203 transmits a bearer configuration request signal to the selected the S-GW 207.

The HSS 204 has a server that manages subscriber information. The HSS 204 performs management of service activation states, authentication, management of user position information (position registration area), and the like. For example, the HSS 204 manages user information such as authentication information, the terminal identification numbers, the telephone numbers of the terminal apparatuses 220, and the like. The HSS 204 transmits control data to and receives control data from the MME 203 and the SGSN 206. User of the MME 203 and the HSS 204 enables 3.9G or 4G communication to be performed.

The RNC 205 is a 3G wireless facility apparatus and controls the NodeBs 202. The RNC 205 transmits control data and user data to and receives control data and user data from the NodeB 202 and the SGSN 206.

The SGSN 206 performs authentication (security control), movement management, and the like of the terminal apparatuses 220 in 3G wireless access. The SGSN 206, for example, controls information such as protocol information, Internet Protocol (IP) addresses, and the like. The SGSN 206 transmits control data and user data to and receives control data and user data from the RNC 205; transmits control data to and receives control data from the HSS 204; and transmits user data to and receives user data from the S-GW 207. Use of the RNC 205 and the SGSN 206 enables 3G communication to be performed.

The S-GW 207 is a node that relays user data. The S-GW 207 is an apparatus that transmits user data. For example, the S-GW 207 transmits user data to and receives user data from the eNodeBs 201, the SGSN 206, and the P-GW 209; and transmits control data to and receives control data from the MME 203 and the PCRF 208.

Further, the S-GW 207 carries out a bearer configuration process with respect to the P-GW 209 configured in the bearer configuration request signal. The S-GW 207, when completing configuration of the bearer between the S-GW 207 and the P-GW 209, notifies the MME 203 of transmission information to the eNodeBs 201.

The PCRF 208 sets rules for billing and priority control according to service. The PCRF 208 transmits control data to and receives control data from the S-GW 207, the P-GW 209, and a Packet Data Network (PDN) 210.

The P-GW 209 is a gateway connected to an external network. Further, the P-GW 209 transmits user data to and receives user data from the S-GW 207 and the PDN 210; and transmits control data to and receives control data from the PCRF 208. For example, the P-GW 209 coordinates with the PCRF 208 and obtains billing information to be applied and further carries out a process of connecting to the PDN 210.

In the wireless access system 100, when the power source of the terminal apparatus 220 is turned ON, the terminal apparatus 220 transmits an attach request signal to the MME 203 and configures a bearer between the S-GW 207 and the P-GW 209, to perform the minimum processes for operation such as authentication and position registration. As a result, at the time of startup and the like, the terminal apparatuses 220 may connect to the PDN 210.

At the time of connection to the network by the terminal apparatuses 220, for example, storage of position information (position registration area) of the terminal apparatuses 220 and sequences with the core apparatus (the HSS 204, the S-GW 207, etc.) for connecting to the network are performed at the HSS 204. In the description hereinafter, connection to the network by the terminal apparatuses 220 will be called "position registration" including storage of position information of a terminal 110 and sequences with the core apparatus. Further, a connection request will be called a "position registration request". Sequences with the core apparatus will be called "position registration sequences".

Furthermore, in the description hereinafter, 3.9G or 4G by the MME 203 and the HSS 204 will be described.

Figure 3:
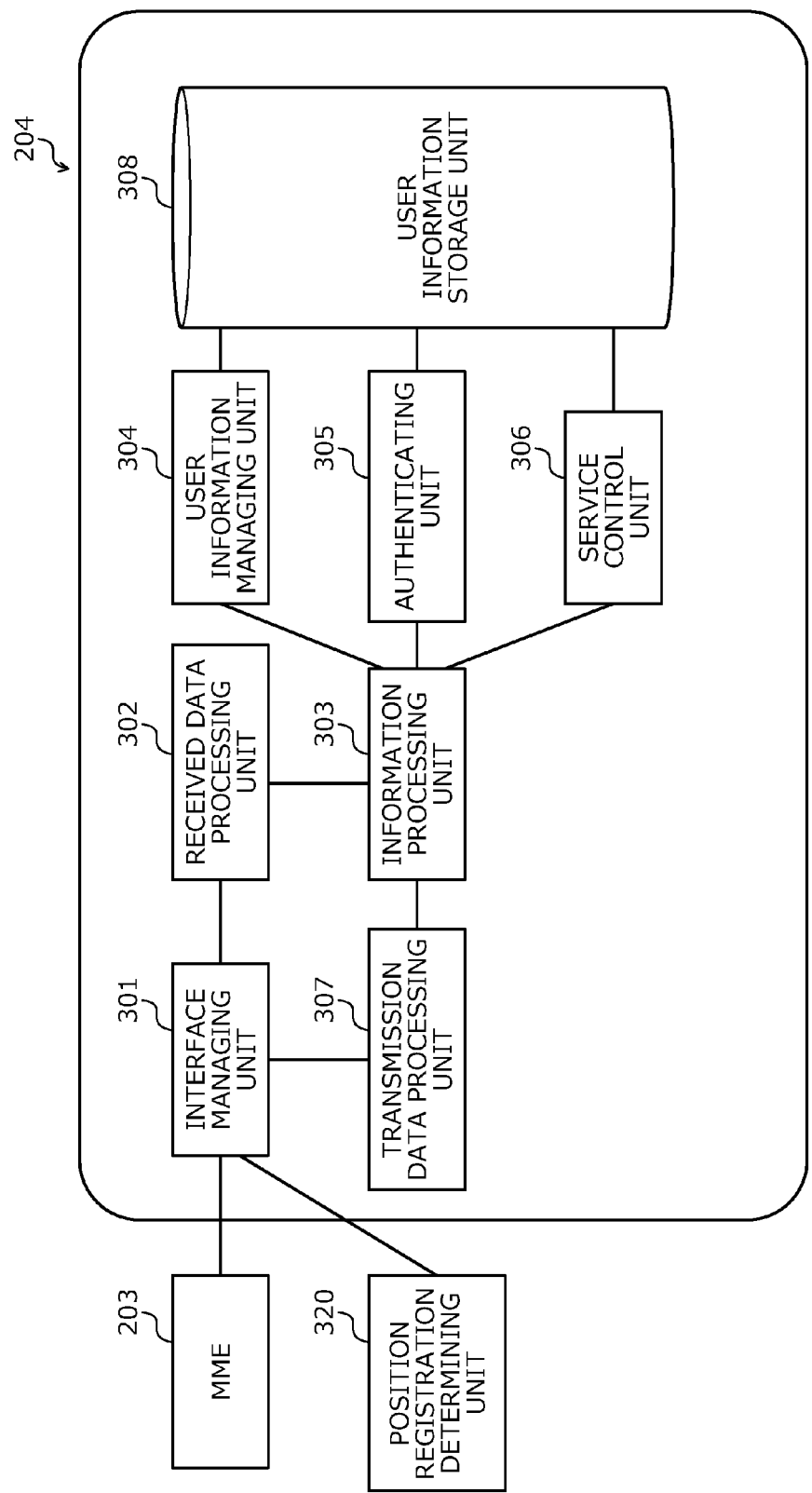
FIG. 3 is an explanatory diagram depicting a configuration example of an HSS.

FIG. 3 is an explanatory diagram depicting a configuration example of the HSS. As depicted in FIG. 3, the HSS 204 has an interface managing unit 301, a received data processing unit 302, an information processing unit 303, a user information managing unit 304, an authenticating unit 305, a service control unit 306, a transmission data processing unit 307, and a user information storage unit 308.

The interface managing unit 301 manages an interface that transmits data to and receives data from the MME 203 and a position registration determining unit 320. The position registration determining unit 320 regards the terminal apparatus 220 whose position does not change for a certain period of time to be a fixed terminal and denies a position registration request to the network from a fixed terminal according to a predetermined probability. The fixed terminal control apparatus 120 depicted in FIG. 1, for example, may be realized by the position registration determining unit 320.

For example, the position registration determining unit 320 is included in the HSS 204. Therefore, functions of the HSS 204 depicted in FIG. 3 represent functions excluding functions of the position registration determining unit 320. However, the position registration determining unit 320, without being included in the HSS 204, may be a separate apparatus and as shown in a modification example described hereinafter, may be included in the MME 203.

The interface managing unit 301 outputs to the received data processing unit 302, a signal received from the MME 203 or the position registration determining unit 320. The received data processing unit 302 performs a reception process for the signal input from the interface managing unit 301 and outputs the signal subjected to the reception process to the information processing unit 303. The information processing unit 303, for example, performs various processes using the signal input from the received data processing unit 302 and outputs signals related to the various processes to the user information managing unit 304, the authenticating unit 305, and the service control unit 306.

The user information storage unit 308 stores user information such as the telephone numbers, the terminal identification numbers, the contract information, the authentication information, the position information, and the like of the terminal apparatuses 220. The user information managing unit 304, for example, uses information of the terminal apparatus 220 indicated by the signal output from the information processing unit 303 and user information stored in the user information storage unit 308 to confirm user registration contents according to the terminal apparatuses 220. The user information managing unit 304, for example, outputs the confirmed contents to the information processing unit 303.

The authenticating unit 305, for example, uses information of the terminal apparatus 220 indicated by the signal output from the information processing unit 303 and user information stored in the user information storage unit 308 to perform authentication of the terminal apparatus 220. The authenticating unit 305 outputs an authentication result to the information processing unit 303.

The service control unit 306, for example, uses information of the terminal apparatus 220 indicated by the signal output from the information processing unit 303 to obtain from the user information stored in the user information storage unit 308, contract information and the like necessary for bearer configuration for the terminal apparatus 220. Further, the service control unit 306, for example, outputs the contract information necessary for bearer configuration for the terminal apparatus 220 to the information processing unit 303.

The information processing unit 303 performs various processes based on the information output from the user information managing unit 304, the authenticating unit 305, and the service control unit 306, and outputs signals related to the various processes to the transmission data processing unit 307. The transmission data processing unit 307 performs a transmission process for transmitting the signals input from the information processing unit 303 and outputs the signals subjected to the transmission process to the interface managing unit 301. The interface managing unit 301 outputs to the MME 203 and the position registration determining unit 320, the signals output from the transmission data processing unit 307.

Figure 4:
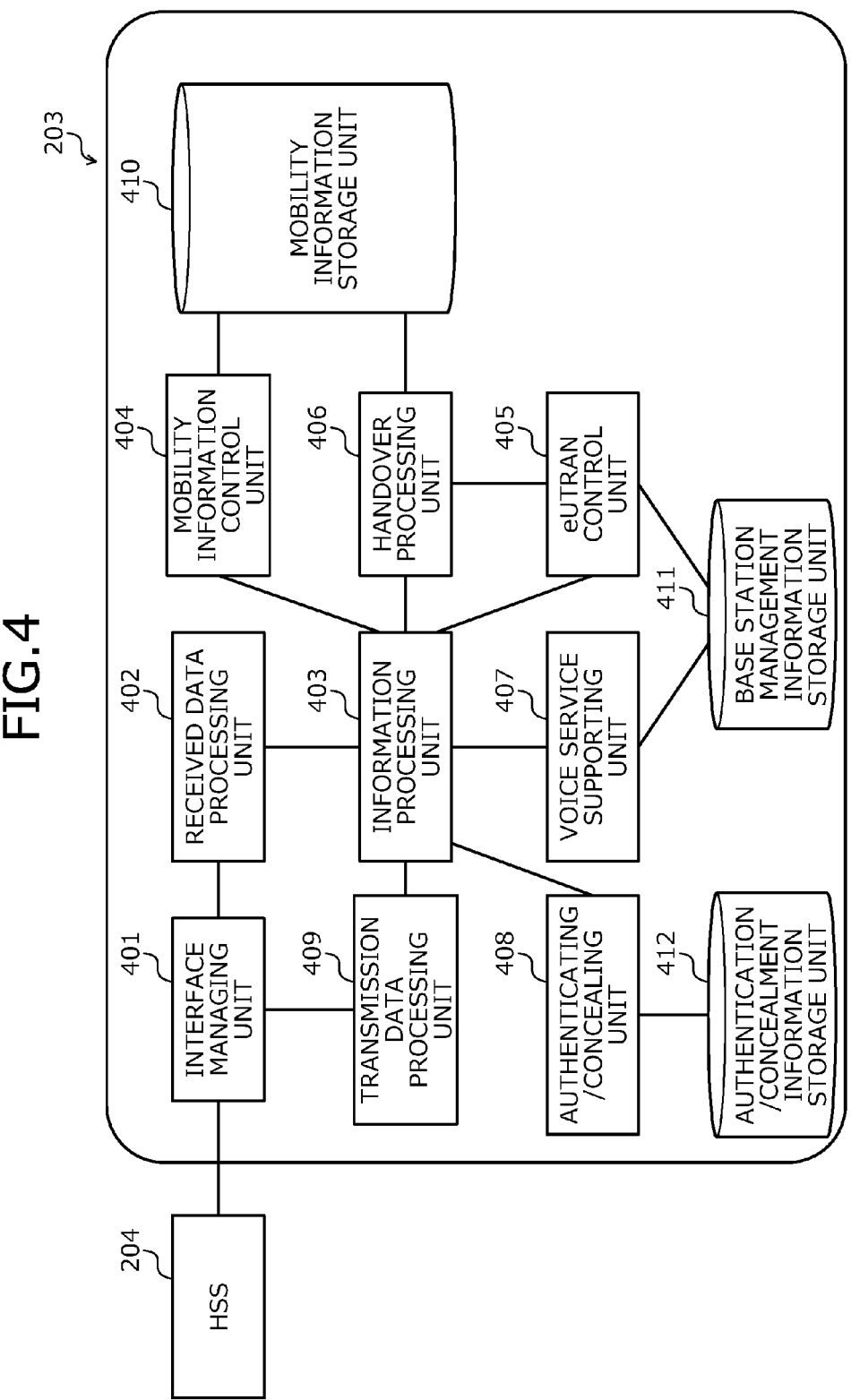
FIG. 4 is an explanatory diagram depicting a configuration example of an MME.

FIG. 4 is an explanatory diagram depicting a configuration example of the MME. As depicted in FIG. 4, the MME 203 has an interface managing unit 401, a received data processing unit 402, an information processing unit 403, a mobility information control unit 404, and a universal terrestrial radio access network (eUTRAN) control unit 405. The MME 203 further has a handover processing unit 406, a voice service supporting unit 407, an authenticating/concealing unit 408, a transmission data processing unit 409, a mobility information storage unit 410, a base station management information storage unit 411, and an authentication/concealment information storage unit 412.

The interface managing unit 401 manages an interface that transmits data to and receives data from the HSS 204. The interface managing unit 401 outputs a signal received from the HSS 204 to the received data processing unit 402. The received data processing unit 402 performs a reception process for the signal input from the interface managing unit 401 and outputs the signal subjected to the reception process to the information processing unit 403.

The information processing unit 403 performs various processes using the signal input from the received data processing unit 402 and outputs signals related to the various processes to the mobility information control unit 404, the handover processing unit 406, the eUTRAN control unit 405, and the voice service supporting unit 407.

The mobility information storage unit 410, for example, stores mobility information for performing seamless movement of the terminal apparatuses 220 between the eNodeBs 201. Even when a terminal apparatus 220 moves, the mobility information control unit 404, for example, is able to continue communication based on the contract information necessary for bearer configuration indicated by the signal output from the information processing unit 403 and the information stored by the mobility information control unit 404.

The base station management information storage unit 411, for example, stores information of the eNodeBs 201. The information of the eNodeBs 201 may be, for example, the ID numbers of the eNodeBs 201 such as the EUTRAN Cell Global ID (Identification) (ECGI) or the like. The eUTRAN control unit 405, for example, uses information indicated by the signal output from the information processing unit 403 and the information stored in the base station management information storage unit 411 to control LTE connection. The eUTRAN control unit 405 outputs to the handover processing unit 406, information controlling LTE connection.

The handover processing unit 406, for example, uses information indicated by the signal output from the information processing unit 403, the information stored in the mobility information storage unit 410, and the information from the eUTRAN control unit 405 to perform a handover process.

Further, the voice service supporting unit 407, for example, uses information indicated by the signal output from the information processing unit 403 and the information stored in the base station management information storage unit 411 to perform a voice service. The authentication/concealment information storage unit 412 stores authentication/concealment information. Further, the authenticating/concealing unit 408, for example, uses authentication information from the HSS 204 indicated by the signal output from the information processing unit 403 and the authentication/concealment information stored in the authentication/concealment information storage unit 412 to control security such as user authentication and the like.

The information processing unit 403, for example, based on the information output from the units 404 to 408, performs various process and outputs signals related to the various processes to the transmission data processing unit 409. The transmission data processing unit 409 performs a transmission process for transmitting the signals input from the information processing unit 403 and outputs the signals subjected to the transmission process to the interface managing unit 401. The interface managing unit 401 outputs to the HSS 204, the signals output from the transmission data processing unit 409.

Figure 5:
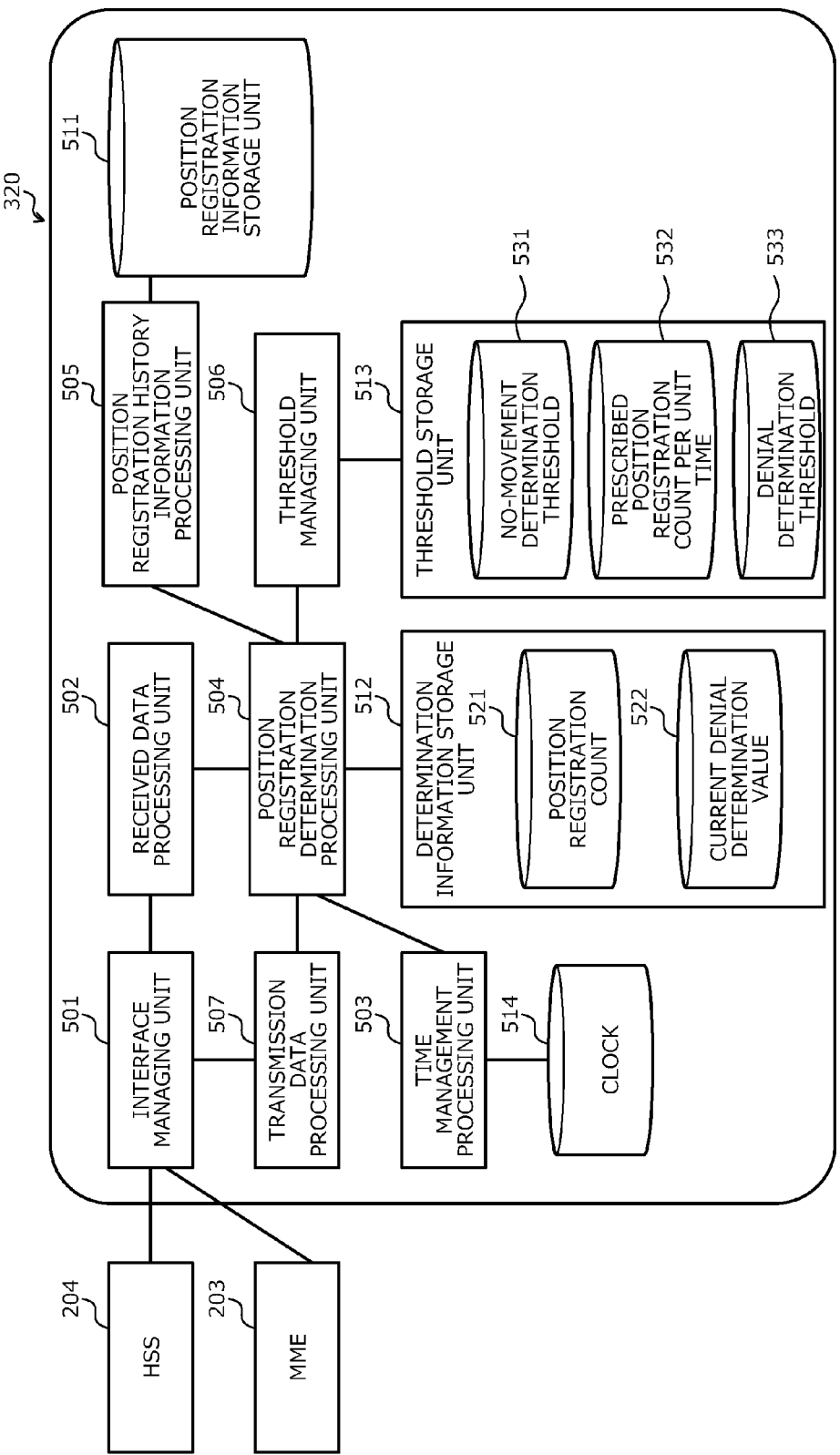
FIG. 5 is an explanatory diagram depicting a configuration example of a position registration determining unit.

FIG. 5 is an explanatory diagram depicting a configuration example of the position registration determining unit. As depicted in FIG. 5, the position registration determining unit 320 has an interface managing unit 501, a received data processing unit 502, a time management processing unit 503, a position registration determination processing unit 504, a threshold managing unit 506, a position registration history information processing unit 505, and a transmission data processing unit 507. The position registration determining unit 320 further has a position registration information storage unit 511, a determination information storage unit 512, a threshold storage unit 513, and a clock 514.

The position registration determining unit 320, for example, is included in the HSS 204. Therefore, the HSS 204 depicted in FIG. 5 represents actual functional units (referred to as "HSS functional units" in the description of FIG. 5) of the HSS 204, excluding the functions of the position registration determining unit 320 of the HSS 204. The interface managing unit 501 manages an interface that transmits data to and receives data from the HSS functional units. The interface managing unit 501 outputs signals received from the HSS functional units to the received data processing unit 502. For example, the interface managing unit 501 receives an attach request from a terminal apparatus 220, via the HSS functional units.

The received data processing unit 502 performs a reception process for the signals input from the interface managing unit 501. For example, the received data processing unit 502 performs a reception process of extracting the terminal number of the terminal apparatus 220 and position information (a position number indicating the position registration area) of the terminal apparatus 220 included in the attach request. The received data processing unit 502 outputs to the position registration determination processing unit 504, the signals subjected to the reception processes. The time management processing unit 503 obtains from the clock 514, a signal indicating the current time and outputs the obtained signal to the position registration determination processing unit 504.

The position registration determination processing unit 504 uses the signals received from the received data processing unit 502 and the signal received from the time management processing unit 503 to determine whether to perform position registration. As described above, the position registration, for example, includes the storage of position information of the terminal apparatus 220 at the HSS 204 and position registration sequences with the core apparatus (with the HSS 204, the S-GW 207, etc.).

In the determination concerning position registration, other than the terminal number and/or the position information from the received data processing unit 502 and the current time from the time management processing unit 503, information stored in the determination information storage unit 512, information from the position registration history information processing unit 505 and the threshold managing unit 506, etc. are used.

For example, the information stored in the determination information storage unit 512 has a position registration count 521 per unit time (predetermined period) and a current denial determination value 522. The position registration count 521, for example, is the number of position registrations within the unit time. The current denial determination value 522, for example, is the probability of position registration being denied within the predetermined period.

Further, the information output by the position registration history information processing unit 505 to the position registration determination processing unit 504 includes position registration information stored in the position registration information storage unit 511. The position registration information includes the terminal number of the terminal apparatus 220, the position number indicating the area in which the terminal apparatus 220 is located, the latest registration date and time, the oldest registration date and time, etc. The position registration history information processing unit 505 writes to and reads out from the position registration information storage unit 511, the position registration information and outputs read out information to the position registration determination processing unit 504.

The information output by threshold managing unit 506 to the position registration determination processing unit 504 includes information (a threshold) stored in the threshold storage unit 513. The threshold storage unit 513 stores a no-movement determination threshold 531, a prescribed position registration count per unit time 532, and a denial determination threshold 533.

The no-movement determination threshold 531 is, for example, a threshold indicating a predetermined period for determining whether a fixed terminal having no change for the predetermined period is at the position indicated by the position information of a terminal apparatus 220. The prescribed position registration count per unit time 532 is, for example, a threshold indicating a predetermined count for determining if the number of times a position registration request is received within a predetermined period is the predetermined count or greater. The denial determination threshold 533 is, for example, a probability of a position registration request from a terminal apparatus 220 being denied.

Determinations made when determination of whether position registration is to be performed by the position registration determination processing unit 504 will be described. First, registration of a terminal apparatus 220 that made a position registration request will be described, the terminal apparatus 220 being registered to the position registration information storage unit 511. The position registration determination processing unit 504 makes an inquiry to the position registration history information processing unit 505 for the position registration information of the terminal apparatus 220 that made a position registration request.

The position registration history information processing unit 505 searches the position registration information stored in the position registration information storage unit 511 for the targeted terminal apparatus 220. If the targeted terminal apparatus 220 is not found, for example, when a fixed terminal such as a vending machine is newly installed, the position registration history information processing unit 505 outputs unregistered information to the position registration determination processing unit 504. The unregistered information is information indicating that the targeted terminal apparatus 220 is not registered in the position registration information storage unit 511.

The position registration determination processing unit 504, when receiving the unregistered information from the position registration history information processing unit 505, determines that the position registration history information processing unit 505 is to perform position registration. The position registration determination processing unit 504 outputs a determination result to the position registration history information processing unit 505. The position registration history information processing unit 505, when receiving the determination result from the position registration determination processing unit 504, newly registers to the position registration information storage unit 511, the terminal number and position information of the targeted terminal apparatus 220. In this manner, when a targeted terminal apparatus 220 is not stored in the position registration information storage unit 511, the position registration determination processing unit 504 assuredly determines that position registration is to be performed. Therefore, position registration sequences with the core apparatus are performed.

When a targeted terminal apparatus 220 is already stored in the position registration information storage unit 511, irrespective of the determination result of the position registration determination, the position registration history information processing unit 505 updates in the position registration information storage unit 511, the position information, the latest registration time, etc. of the targeted terminal apparatus 220.

Identification of a fixed terminal by the position registration determination processing unit 504 will be described. First, the position registration determination processing unit 504 makes an inquiry to the position registration history information processing unit 505 for the position registration information of a targeted terminal apparatus 220 that made a position registration request.

The position registration history information processing unit 505 searches the position registration information stored in the position registration information storage unit 511 for the targeted terminal apparatus 220 and extracts the targeted terminal apparatus 220. The position registration history information processing unit 505 outputs to the position registration determination processing unit 504, the extracted position registration information such as the latest registration time and area number of the terminal apparatus 220.

Further, the position registration determination processing unit 504 makes an inquiry to the time management processing unit 503 for the current time. The time management processing unit 503, when receiving the inquiry from the position registration determination processing unit 504, outputs a signal indicating the current time to the position registration determination processing unit 504.

The position registration determination processing unit 504 further makes an inquiry to the threshold managing unit 506 for the no-movement determination threshold 531. The threshold managing unit 506, when receiving the inquiry from the position registration determination processing unit 504, reads in the no-movement determination threshold 531 stored in the threshold storage unit 513 and outputs a signal indicating the no-movement determination threshold 531 to the position registration determination processing unit 504.

The position registration determination processing unit 504 calculates the difference of current time indicated by the signal input from the time management processing unit 503 and the latest registration time included in the position registration information of the target terminal apparatus 220, received from the position registration history information processing unit 505. The position registration determination processing unit 504 identifies the terminal apparatus 220 to be a fixed terminal, when the calculated difference is the no-movement determination threshold 531 indicated by the signal received from the threshold managing unit 506 or greater. The position registration determination processing unit 504 determines that according to the predetermined probability, position registration is not to be performed for the terminal apparatus 220 identified to be a fixed terminal.

Next, an instance will be described in which the position registration determination processing unit 504 determines whether position registration is to be performed, according to the extent of concentration of the position registration sequences for connecting the terminal apparatus 220 to the network. First, the position registration determination processing unit 504 reads in the position registration count 521 stored in the determination information storage unit 512.

The position registration determination processing unit 504 further makes an inquiry to the threshold managing unit 506 for the prescribed position registration count per unit time 532. The threshold managing unit 506, when receiving the inquiry from the position registration determination processing unit 504, reads in the prescribed position registration count per unit time 532 stored in the threshold storage unit 513 and outputs a signal indicating the prescribed position registration count per unit time 532 to the position registration determination processing unit 504.

The position registration determination processing unit 504 determines that position registration is possible, when the position registration count 521 read in from the determination information storage unit 512 is less than the prescribed position registration count per unit time 532 indicated by the signal received from the threshold managing unit 506. The position registration determination processing unit 504 updates the position registration count 521, when determining that position registration is to be performed.

Further, the position registration determination processing unit 504 determines that position registration is not to be performed, when the position registration count 521 read in from the determination information storage unit 512 is the prescribed position registration count per unit time 532 indicated by the signal received from the threshold managing unit 506 or greater. In other words, when the position registration sequences for connecting the terminal apparatus 220 to the network are concentrating, the position registration determination processing unit 504 may determine that position registration is not to be performed.

Next, the probability of the position registration determination processing unit 504 denying the position registration of the terminal apparatus 220 will be described. First, the position registration determination processing unit 504 reads in the current denial determination value 522 stored in the determination information storage unit 512.

The position registration determination processing unit 504 makes an inquiry to the threshold managing unit 506 for the denial determination threshold 533. The threshold managing unit 506, when receiving the inquiry from the position registration determination processing unit 504, reads in the denial determination threshold 533 stored in the threshold storage unit 513 and outputs a signal indicating the denial determination threshold 533 to the position registration determination processing unit 504.

The position registration determination processing unit 504 determines that position registration is possible, when the current denial determination value 522 read in from the determination information storage unit 512 is less than the denial determination threshold 533 indicated by the signal received from the threshold managing unit 506. Further, the position registration determination processing unit 504 determines that position registration is not to be performed, when the current denial determination value 522 read in from the determination information storage unit 512 is the denial determination threshold 533 indicated by the signal received from the threshold managing unit 506 or greater. The position registration determination processing unit 504 uses the determination result to update the current denial determination value 522.

In this manner, the position registration determination processing unit 504 may determine whether position registration is to be performed. The position registration determination processing unit 504, with respect to the MME 203 and the terminal apparatus 220, generates a signal for performing a position registration response that is a determination result of whether position registration is to be performed, and outputs the generated signal to the transmission data processing unit 507.

The transmission data processing unit 507 performs a transmission process for transmitting the signal input from the position registration determination processing unit 504 and outputs the signal subjected to the transmission process to the interface managing unit 501. The interface managing unit 501 outputs to the MME 203 and the HSS functional units, the signal output from the transmission data processing unit 507.

In the determination concerning position registration, the position registration determination processing unit 504 uses the position registration information stored in the position registration information storage unit 511, however, configuration is not limited hereto. For example, the user information storage unit 308 of the HSS 204 may store the same position registration information and this position registration information may be used.

Figure 6:
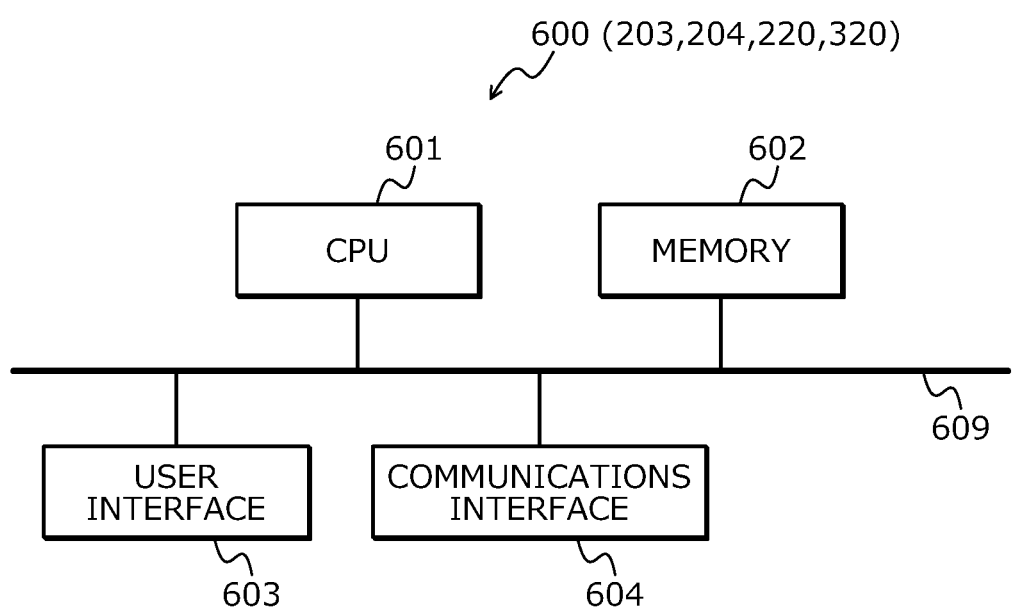
FIG. 6 is a diagram depicting one example of hardware configuration of a computer apparatus.

FIG. 6 is a diagram depicting one example of hardware configuration of a computer apparatus. As depicted in FIG. 6, a computer apparatus 600 of the MME 203, the HSS 204, the terminal apparatus 220, and the position registration determining unit 320, etc. includes a central processing unit (CPU) 601, a memory 602, a user interface 603, and a communications interface 604. The CPU 601, the memory 602, the user interface 603, and the communications interface 604 are connected by a bus 609.

The CPU 601 governs overall control of the computer apparatus 600. The memory 602, for example, includes main memory and auxiliary memory. The main memory, for example, is random access memory (RAM). The main memory is used as a work area of the CPU 601.

The auxiliary memory, for example, is non-volatile memory such as a magnetic disk, an optical disk, flash memory, and the like. The auxiliary memory stores various types of programs that cause the computer apparatus 600 to operate. The programs stored in the auxiliary memory are loaded onto the main memory and executed by the CPU 601.

The user interface 603, for example, includes an input device that receives operational input from the user and an output device that outputs information to the user. The input device, for example, may be realized by a touch panel or keys (for example, a keyboard), a remote controller, or the like. The output device, for example, may be realized by a touch panel, a display, a speaker, or the like. The user interface 603 is controlled by the CPU 601.

The communications interface 604, for example, is a communications interface that performs wired or wireless communication with an external apparatus of the computer apparatus 600. The communications interface 604 is controlled by the CPU 601.

The identifying unit 121 and the control unit 122 depicted in FIG. 1 are functions realized by executing on the CPU 601, a program stored in the memory 602. Further, the functional units 301 to 307 depicted in FIG. 3 are realized by executing on the CPU 601, a program stored in the memory 602, or by a function of the communications interface 604. Further, the user information storage unit 308 depicted in FIG. 3 is realized by the memory 602.

Further, the functional units 401 to 409 depicted in FIG. 4 are functions realized by executing on the CPU 601, a program stored in the memory 602, or by a function of the communications interface 604. The mobility information storage unit 410, the base station management information storage unit 411, and the authentication/concealment information storage unit 412 depicted in FIG. 4 are realized by the memory 602.

The functional units 501 to 507 depicted in FIG. 5 are realized by executing on the CPU 601, a program stored in the memory 602 or by a function of the communications interface 604. The position registration information storage unit 511, the determination information storage unit 512, and the threshold storage unit 513 depicted in FIG. 5 are realized by the memory 602.

FIG. 7A is an explanatory diagram depicting an example of registration information stored in the position registration information storage unit. As depicted in FIG. 7A, the position registration information storage unit 511 has fields for terminal numbers, registration dates and times, position numbers, etc. Information is set into these fields whereby registration information 701-1 to 701-5 for each combination of a terminal number, a registration date and time, a position number, etc. is stored in the position registration information storage unit 511.

A terminal number is information identifying the terminal apparatus 220. Registration, for example, includes an oldest registration and a latest registration. The oldest registration, for example, indicates the oldest registration date representing the date that the current position information was changed to. However, the oldest registration may indicate the oldest registration date and time representing the date and time that the current position information was changed to. Further, the latest registration, for example, indicates the latest registration date and time representing the date and time that the current position information was changed to. However, the latest registration may indicate the latest registration date representing the date that the current position information was changed to. The position number is information identifying the position registration area in which the terminal apparatus 220 is located.

FIG. 7B is an explanatory diagram depicting an example registration information stored by the determination information storage unit. As depicted in FIG. 7B, the determination information storage unit 512 has fields for the position registration count 521 and the current denial determination value 522. Information is set into these fields whereby the position registration count 521 and the current denial determination value 522 are each stored in the determination information storage unit 512.

The position registration count 521 indicates a count of the number of times that position registration was performed per unit time. The position registration determination processing unit 504, when performing one position registration for the terminal apparatus 220, adds one to the position registration count 521. The current denial determination value 522 represents a ratio of the number of all the terminal apparatuses 220 that had an attach request and the current terminal apparatuses 220 denied and, for example, is represented as a percentage.

FIG. 8A is a sequence diagram (part 1) depicting an example of the position registration performed by the wireless access system. FIG. 8B is a sequence diagram (part 2) of the example of the position registration performed by the wireless access system. As depicted in FIGS. 8A and 8B, the terminal apparatus 220, when the power source is turned ON, transmits an attach request to the HSS 204, via the eNodeB 201 and the MME 203 (step S801). When the terminal apparatus 220 makes the attach request, the terminal apparatus 220, the eNodeB 201, the MME 203, and the HSS 204 each performs thereamong authentication, concealing, and integrity control.

Next, the MME 203 makes a position registration request to the HSS 204 (step S802). The HSS 204 stores position information (step S803). The HSS 204 performs a position registration determination process (refer to FIGS. 9A and 9B) (step S804). Next, the HSS 204 determines from a result of the position registration determination process, whether position registration is to be performed (step S805).

When position registration is not to be performed (step S805: NO), the HSS 204 transmits to the MME 203, a position registration response indicating denial of the position registration (step S806). The MME 203 transmits to the terminal apparatus 220, an attach response indicating denial of the position registration (step S807). The terminal apparatus 220 retransmits an attach request after a certain period of time (step S808), and ends the series of operations.

When position registration is to be performed (step S805: YES), the position registration sequences depicted in FIG. 8B are performed. In the position registration sequences, first, the HSS 204 makes a position registration response to the MME 203 (step S809). The MME 203 makes a bearer configuration request to the S-GW 207 (step S810). When the S-GW 207 receives the bearer configuration request from the MME 203, the S-GW 207, the PCRF 208, the P-GW 209, and the PDN 210 perform a bearer configuration process thereamong (step S811).

When the bearer configuration process is performed, the S-GW 207 transmits a bearer configuration response to the MME 203 (step S812). The MME 203, when receiving the bearer configuration response from the S-GW 207, transmits to the eNodeB 201, a wireless bearer configuration request indicating attach acceptance (step S813). When receiving from the MME 203, the wireless bearer configuration request indicating attach acceptance, the eNodeB 201 transmits to the terminal apparatus 220, the wireless bearer configuration request indicating attach acceptance (step S814).

When receiving from the eNodeB 201, the wireless bearer configuration request indicating attach acceptance, the terminal apparatus 220, transmits a wireless bearer configuration response to the eNodeB 201 (step S815). The eNodeB 201, when receiving the wireless bearer configuration response from the terminal apparatus 220, transmits the wireless bearer configuration response to the MME 203 (step S816).

The terminal apparatus 220 transmits to the MME 203, a signal indicating attach completion (step S817). When receiving from the terminal apparatus 220, the signal indicating attach completion, the MME 203 makes a bearer update request to the S-GW 207 (step S818). When the S-GW 207 receives the bearer update request from the MME 203, the S-GW 207, the PCRF 208, the P-GW 209, and the PDN 210 perform thereamong a bearer update process (step S819). When the bearer update process is performed, the S-GW 207 transmits a bearer update response to the MME 203 (step S820), and ends the series of operations.

Figure 9A:
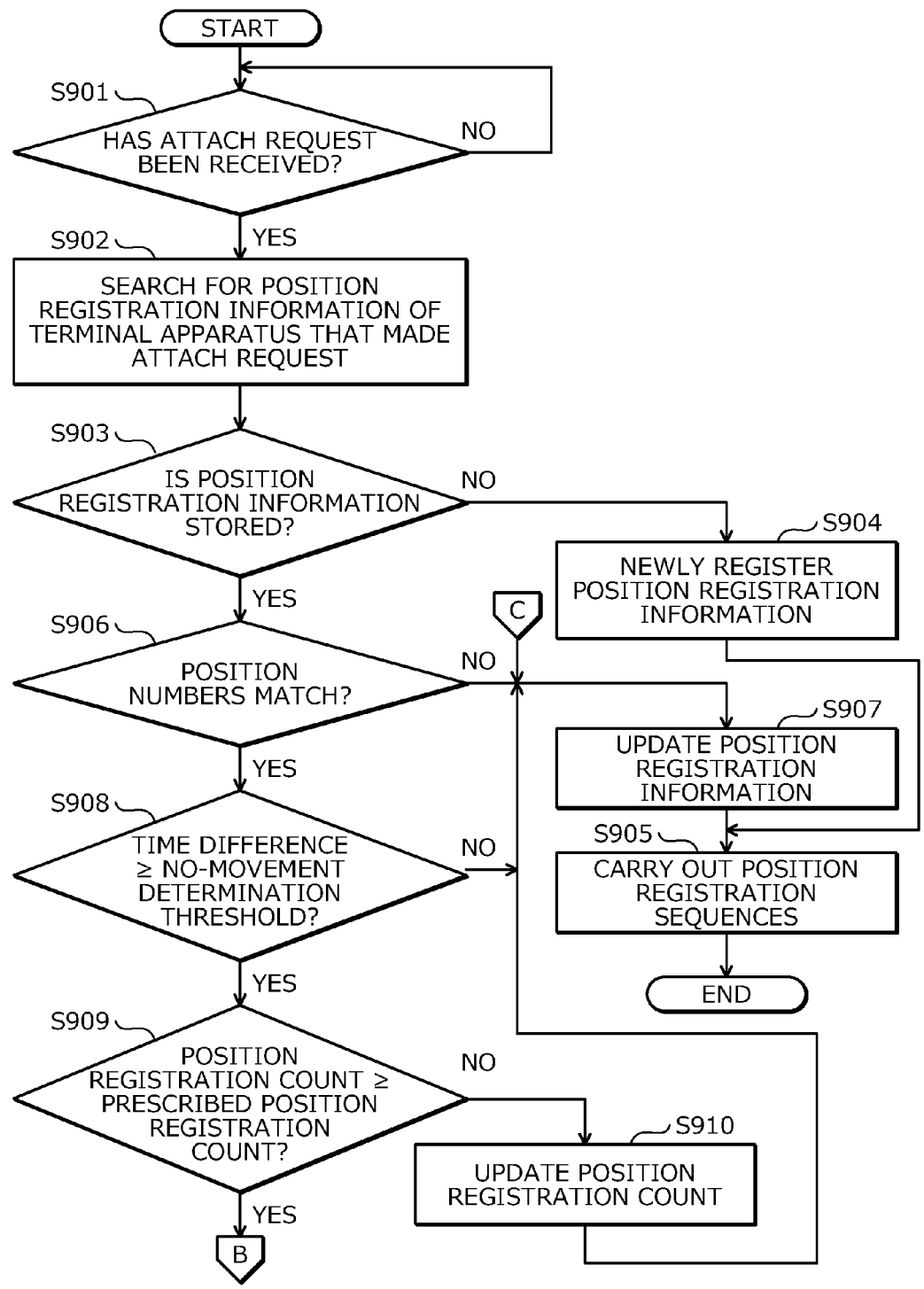
FIG. 9A is a flowchart (part 1) of an example of a position registration determination process performed by the position registration determining unit.
Figure 9B:
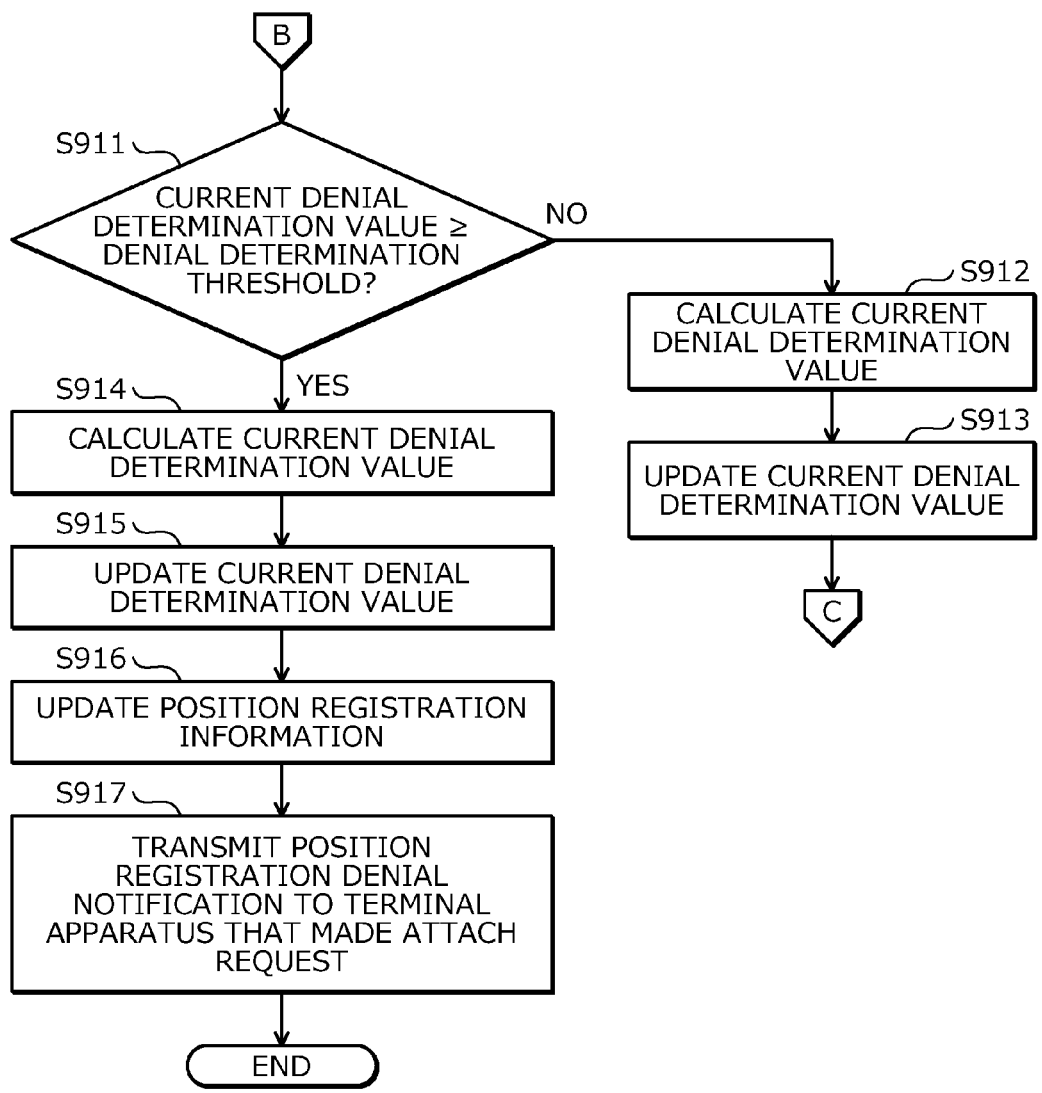
FIG. 9B is a flowchart (part 2) of the example of the position registration determination process performed by the position registration determining unit.

FIG. 9A is a flowchart (part 1) of an example of the position registration determination process performed by the position registration determining unit. FIG. 9B is a flowchart (part 2) of the example of the position registration determination process performed by the position registration determining unit. As depicted in FIGS. 9A and 9B, the position registration determining unit 320 determines whether an attach request has been received from a terminal apparatus 220 (step S901). The attach request includes the terminal number of the terminal apparatus 220 and the position number indicating the area in which the terminal apparatus 220 is located.

The position registration determining unit 320 stands by until an attach request is received (step S901: NO). The position registration determining unit 320, when receiving an attach request (step S901: YES), searches the position registration information stored in the position registration information storage unit 511, for the terminal apparatus 220 that made the attach request (step S902).

Next, the position registration determining unit 320 determines whether position registration information of the terminal apparatus 220 that made the attach request is in the position registration information storage unit 511 (step S903). When position registration information of the terminal apparatus 220 that made the attach request is not in the position registration information storage unit 511 (step S903: NO), the position registration determining unit 320 newly registers position registration information into the position registration information storage unit 511 (step S904). In the registration of the position registration information, the terminal number, the registration date and time (the oldest registration date and time), the position number, etc. are registered. Thereafter, the position registration determining unit 320 carries out the position registration sequences (step S905), and ends the series of operations.

When position registration information of the terminal apparatus 220 that made the attach request is in the position registration information storage unit 511 (step S903: YES), the position registration determining unit 320 determines whether the position number of the terminal apparatus 220 that made the attach request and the position number in the position registration information match (step S906). When the position number of terminal apparatus 220 that made the attach request and the position number in the position registration information do not match (step S906: NO), the position registration determining unit 320 updates the position registration information (step S907), and transitions to step S905. In the updating of position registration information, for example, the terminal number, the latest registration date and time, the oldest registration date and time, the position number, etc. are updated.

When the position number of the terminal apparatus 220 that made the attach request and the position number in the position registration information match (step S906: YES), the position registration determining unit 320 determines if the difference of the current time and the latest registration time is the no-movement determination threshold 531 or greater (step S908). The no-movement determination threshold 531, for example, may be set in advance, expressed in units of minutes, hours, days, or the like.

When the difference of the current time and the latest registration time is less than the no-movement determination threshold 531 (step S908: NO), i.e., a case of a mobile terminal, the position registration determining unit 320 transitions to step S907 and updates the position registration information. In the updating of the position registration information, for example, the latest registration date and time are updated.

At step S908, when the difference is the no-movement determination threshold 531 or greater (step S908: YES), i.e., a case of a fixed terminal, the position registration determining unit 320 determines if the position registration count 521 per unit time is the prescribed position registration count per unit time 532 or greater (step S909). The prescribed position registration count 532 is, for example, 100.

When the position registration count 521 per unit time is less than the prescribed position registration count per unit time 532 (step S909: NO), i.e., when the position registration sequences are not concentrating, the position registration determining unit 320 transitions to step S910. At step S910, the position registration determining unit 320 updates the position registration count 521 stored in the determination information storage unit 512 (step S910), and transitions to step S907. In the updating of the position registration information at step S907 in this case, for example, the latest registration date and time are updated.

When the position registration count 521 per unit time is the prescribed position registration count per unit time 532 or greater (step S909: YES), i.e., when the position registration sequences are concentrating, the position registration determining unit 320 transitions to step S911. At step S911, the position registration determining unit 320 determines if the current denial determination value 522 is the denial determination threshold 533 or greater (step S911). The denial determination threshold 533 is, for example, 50%.

When the current denial determination value 522 is less than the denial determination threshold 533 (step S911: NO), the position registration determining unit 320 calculates the current denial determination value 522 (step S912). The position registration determining unit 320 updates the current denial determination value 522 stored in the determination information storage unit 512 (step S913), and transitions to step S907. In the updating of the position registration information at step S907 in this case, for example, the latest registration date and time are updated.

When the current denial determination value 522 is the denial determination threshold 533 or greater (step S911: YES), the position registration determining unit 320 calculates the current denial determination value 522 (step S914). The position registration determining unit 320 updates the current denial determination value 522 (step S915). Next, the position registration determining unit 320 updates the position registration information (step S916). In the updating of the position registration information, for example, the latest registration date and time are updated. The position registration determining unit 320 transmits position registration denial notification to the terminal apparatus 220 that made the attach request (step S917), and ends the series of operations.

As described above, according to the embodiment, when a power outage occurs in a region in which fixed terminals (the terminal apparatus 220) that use an external power source, at the time when the power outage is resolved, position registration requests for connecting to the network may be transmitted to the core apparatus from the fixed terminals all at once. In the present embodiment, position registration requests from the fixed terminals to the network are denied according to a predetermined probability whereby when the external power source is restored after a power outage, processes of connecting the terminal apparatuses 220 to the network are distributed, enabling congestion to be suppressed.

Further, in the present embodiment, when a position registration request is denied by the position registration determining unit 320, the terminal apparatus 220 again makes a position registration request to the position registration determining unit 320 (the HSS 204). Therefore, even a terminal apparatus 220 whose position registration request is denied may connect to the network.

Further, in the present embodiment, when the position registration count 521 per unit time is the prescribed position registration count 532 or greater, i.e., when position registration sequences for the terminal apparatus 220 to connect to the network are concentrating, configuration may be such that position registration is not performed.

However, in the present embodiment, the greater the position registration count 521 per unit time is, the higher the denial determination threshold 533 may be set. As a result, configuration may be such that using the denial determination threshold 533 corresponding to the extent that the position registration sequences for connecting the terminal apparatus 220 to the network, the position registration is not performed.

Further, in the present embodiment, when the number of times that a position registration request from the terminal apparatus 220 has been accepted per unit time is a predetermined count or greater, a position registration request may be denied. As a result, in cases where position registration requests are numerous at the time of power source restoration after a power outage, the position registration request from a terminal apparatus 220 may be denied.

Further, in the present embodiment, the terminal apparatus 220 may deny a connection request according to a probability corresponding to the number of times that a position registration request has been received per unit time. As a result, the connection request from a terminal apparatus 220 may be denied according to a probability corresponding to the number of connection requests at the time of restoration of the power source after a power outage.

Further, in the present embodiment, although 3.9G or 4G that uses the HSS 204 has been described, in the case of 3G, a function of the position registration determining unit 320 may be included in the SGSN 206. As a result, in the case of 3G as well, effects identical to those of the present embodiment may be obtained.

The modification example of the embodiment will be described. In the embodiment described above, a case in which the HSS 204 includes the position registration determining unit 320 has been described, however, in the modification example, a case where the MME 203 has the position registration determining unit 320 will be described.

Figure 10A:
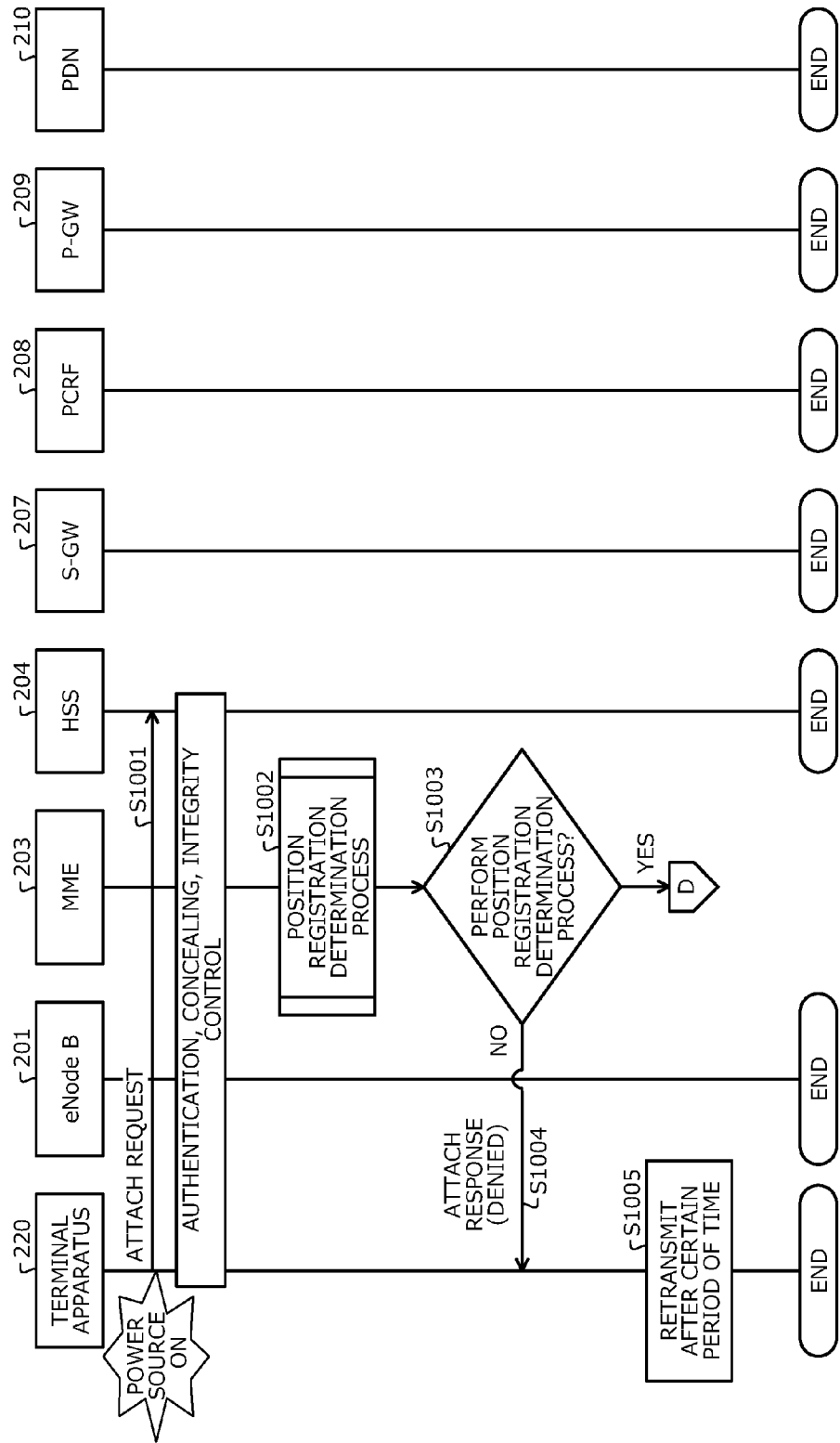
FIG. 10A is a sequence diagram (part 1) of a modification example of the position registration performed by the wireless access system.

FIG. 10A is a sequence diagram (part 1) of a modification example of the position registration performed by the wireless access system. FIG. 10B is a sequence diagram (part 2) of the modification example of the position registration performed by the wireless access system. As depicted in FIGS. 10A and 10B, the terminal apparatus 220, when the power source is turned ON, transmits an attach request to the HSS 204, via the eNodeB 201 and the MME 203 (step S1001). When the terminal apparatus 220 makes the attach request, the terminal apparatus 220, the eNodeB 201, the MME 203, and the HSS 204 each performs thereamong authentication, concealing, and integrity control.

The MME 203 performs a position registration determination process (refer to FIGS. 9A and 9B) (step S1002). Next, the MME 203 determines from a result of the position registration determination process, whether position registration is to be performed (step S1003).

When position registration is not to be performed (step S1003: NO), the MME 203 transmits to the terminal apparatus 220, an attach response indicating denial of the position registration (step S1004). The terminal apparatus 220 retransmits an attach request after a certain period of time (step S1005), and ends the series of operations.

When position registration is to be performed (step S1003: YES), the MME 203 makes a position registration request to the HSS 204 (step S1006). The HSS 204 stores position information (step S1007). Next, the HSS 204 makes a position registration response to the MME 203 (step S809). Thereafter, the wireless access system 100 performs the same position registration sequences as those depicted in FIG. 8B.

In the modification example, in the position registration determination, the position registration information stored in the position registration information storage unit 511 included in the MME 203 is used. However, without limitation hereto, the HSS 204 may store the same position registration information and the position registration information may be obtained from the HSS 204.

According to the modification example, effects identical to those of the embodiment may be obtained. In this manner, functional units performing the position registration determination may be included in the MME 203. Further, in the modification example, although 3.9G or 4G that use the MME 203 has been described, in the case of 3G, a function of the position registration determining unit 320 may be included in the RNC 205. As a result, in the case of 3G as well, effects identical to those of the modification example may be obtained.

However, for example, in an area in which fixed terminals using an external power source are arranged in plural, when a power outage occurs connection requests for connecting to the network are transmitted all at once from the fixed terminals, when the power outage is resolved. Thus, a problem arises in that sequences for connecting the fixed terminals to the network concentrate and congestion of the network occurs.

One aspect of the present invention enables network congestion to be suppressed.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless access system comprising:
   a terminal; and
   a fixed terminal control apparatus configured to identify, based on position information of the terminal, whether the terminal is a fixed terminal having no change in position for a predetermined period of time,
   wherein the fixed terminal control apparatus is further configured to identify whether the terminal is the fixed terminal, when the fixed terminal control apparatus receives from the terminal, a connection request requesting connection to a network of the terminal,
   wherein the fixed terminal control apparatus is further configured to deny the connection request according to a predetermined probability of denying, when identifying the terminal to be the fixed terminal, and
   wherein the fixed terminal control apparatus is further configured to not deny the connection request from the terminal that is identified to be the fixed terminal, when receiving at least one connection request requesting a connection to the network from one or more terminals within a predetermined period of time and a number of times that the at least one connection request is not denied is less than a predetermined count.

2. The wireless access system according to claim 1, wherein the terminal again makes the connection request, when the connection request is denied.

3. The wireless access system according to claim 1, wherein the fixed terminal control apparatus is included in a home subscriber server that manages the terminal.

4. The wireless access system according to claim 1, wherein the fixed terminal control apparatus is included in a mobile management entity that manages the terminal.

5. The wireless access system according to claim 1, wherein the fixed terminal control apparatus receives at least one connection request requesting connection to the network from one or more terminals within a predetermined period, and denies the connection request from the terminal that is identified to be the fixed terminal, according to the predetermined probability corresponding to a number of times that the at least one connection request is not denied.

6. The wireless access system according to claim 1, wherein the fixed terminal control apparatus does not deny the connection request from the terminal that is identified to be the fixed terminal, when a count of at least one connection request requesting connection to the network received from one or more terminals within a predetermined period is less than a predetermined count.

7. The wireless access system according to claim 1, wherein the fixed terminal control apparatus denies the connection request from the terminal that is identified to be the fixed terminal, according to the predetermined probability corresponding to a number of times that at least one connection request requesting connection to the network is received from one or more terminals.

8. A fixed terminal control apparatus comprising:
   a memory; and
   a processor coupled to the memory, the processor configured to:
   identify, based on position information of a terminal, whether the terminal is a fixed terminal having no change in position for a predetermined period of time, and identify whether the terminal is the fixed terminal, when the fixed terminal control apparatus receives from the terminal, a connection request requesting connection to a network of the terminal; and
   deny the connection request according to a predetermined probability of denying, when the terminal is identified to be the fixed terminal,
   wherein the processor is further configured to not deny the connection request from the terminal that is identified to be the fixed terminal, when receiving at least one connection request requesting a connection to the network from one or more terminals within a predetermined period of time and a number of times that the at least one connection request is not denied is less than a predetermined count.

* * * * *